(12) United States Patent
Wada et al.

(10) Patent No.: US 9,354,082 B2
(45) Date of Patent: May 31, 2016

(54) METER READER ALLOCATION SYSTEM AND METER READER ALLOCATION METHOD

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/410,807

(22) PCT Filed: Jul. 2, 2013

(86) PCT No.: PCT/JP2013/004112
§ 371 (c)(1),
(2) Date: Dec. 23, 2014

(87) PCT Pub. No.: WO2014/006889
PCT Pub. Date: Jan. 9, 2014

(65) Prior Publication Data
US 2015/0192429 A1  Jul. 9, 2015

(30) Foreign Application Priority Data
Jul. 4, 2012 (JP) ................................ 2012-150731

(51) Int. Cl.
*G01D 4/00* (2006.01)
*G06Q 10/06* (2012.01)
*G06Q 50/06* (2012.01)

(52) U.S. Cl.
CPC ................ *G01D 4/002* (2013.01); *G01D 4/006* (2013.01); *G06Q 10/06* (2013.01); *G06Q 50/06* (2013.01); *Y02B 90/243* (2013.01); *Y04S 20/325* (2013.01)

(58) Field of Classification Search
CPC .................. G01D 4/002–4/006; G01R 22/10; G01R 22/063; B07C 3/00; G06Q 10/06; G06Q 50/06; Y02B 90/243; Y04S 20/32; Y04S 20/322–20/327
See application file for complete search history.

(56) References Cited

U.S. PATENT DOCUMENTS

| 2005/0078006 A1* | 4/2005 | Hutchins et al. ............. 340/561 |
| 2005/0179561 A1* | 8/2005 | Osterloh et al. .......... 340/870.02 |
| 2008/0042871 A1* | 2/2008 | Donaghey et al. ....... 340/870.01 |
| 2009/0085743 A1* | 4/2009 | Ravi et al. ................. 340/572.1 |

(Continued)

FOREIGN PATENT DOCUMENTS

| JP | H08329159 | 12/1996 |
| JP | 2012003660 | 1/2012 |
| JP | 2012238204 | 12/2012 |

OTHER PUBLICATIONS

The International Preliminary Examination Report on Patentability mailed Jan. 15, 2015 for PCT application No. PCT/JP2013/004112, 6 pages.

(Continued)

*Primary Examiner* — Hai Phan
*Assistant Examiner* — Orlando Bousono
(74) *Attorney, Agent, or Firm* — Lee & Hayes, PLLC

(57) ABSTRACT

A server includes: an allocation unit that switches areas responsible for the respective meter readers based on an order for allocating a plurality of meter readers of a meter reader management unit and an order for allocating areas of an area management unit to allocate the switched area to the respective meter readers; and an instructing unit that instructs the allocated meter readers to read the corresponding areas.

12 Claims, 4 Drawing Sheets

(56) References Cited

U.S. PATENT DOCUMENTS

| | | | |
|---|---|---|---|
| 2009/0218262 A1* | 9/2009 | Bowers et al. | 209/584 |
| 2010/0207784 A1* | 8/2010 | Bragg et al. | 340/870.03 |
| 2010/0299457 A1* | 11/2010 | Johnson | 710/13 |

OTHER PUBLICATIONS

The PCT Search Report mailed Jul. 30, 2013 for PCT application No. PCT/JP2013/004112, 1 page.

Office Action dated Feb. 10, 2015 in corresponding Australian Patent Application No. 2013284895, 5 pages.

Cosgel M. M. et al., "Job Rotation: Cost, Benefits, and Stylized Facts" Zeitschrift fur die fesamte Staatswissenschaft vol. 155, No. 2 (Jun. 1999), published by Mohr Siebeck GmbH & Co. KG, pp. 301-320.

"Rotating Schedule Workforce Management" retrieved from the internet on Feb. 10, 2015, published on or before Jun. 10, 2012 as per Wayback Machine, 4 pages.

* cited by examiner

METER READER ALLOCATION SYSTEM AND METER READER ALLOCATION METHOD

FIELD OF THE INVENTION

The present invention relates to a system and a method for allocating meter readers for gas meter reading.

BACKGROUND ART

It is known that LP gas is supplied by gas imported from gas-producing countries and gas as a byproduct of domestic process of petroleum oil products. An import base for storing LP gas transferred from gas-producing countries by a tanker and a petroleum oil purification base are referred to as a primary base. LP gas is loaded from the primary base to domestic vessels or tank trucks and is shipped to a secondary base that is located at a coast or an inland and that functions as a supply base for LP gas transportation. The LP gas transported to the secondary base is transported to an LP gas filling station at each location (i.e., a delivery base) and is filled into a gas cylinder (gas bottle) at a delivery base.

The gas cylinders filled at the respective filling stations are delivered by a deliveryman to a customer's home (e.g., a standard home, collective housing, or office). An empty gas cylinder of the customer's home is exchanged with a filled gas cylinder and the empty gas cylinder is collected to a filling station. Each filling station has a fixed delivery area for which a deliveryman is responsible. A deliveryman receives delivery slips corresponding to 2 to 10 days showing delivery destinations to which gas cylinders should be delivered to customer's homes within the delivery area.

A delivery slip is prepared by a delivery manager. First, with regard to each customer, the amount of LP gas remaining in the gas cylinder is predicted based on the past gas usage, the meter indication of the gas meter of the customer's home, and the actually-delivered number. Then, the next delivery due date of gas cylinder(s) is determined. Integration is carried out for all customers within the delivery area for which the deliveryman is responsible to determine the delivery amount of gas cylinders corresponding to 2 to 10 days.

After the deliveryman exchanges the gas cylinder with the new one based on the delivery slip, the deliveryman writes, into a delivery slip, the respective items of a date of exchange, the meter indication of the exchange date, the cylinder number, and the safety inspection. When the daily delivery operation is completed, the delivery slip is submitted to the delivery manager. The delivery slip returned to the delivery manager is checked for an incomplete form by the delivery manager and is subsequently stored as data used to calculate the next delivery due date. A system has been suggested to provide an efficient delivery of gas cylinders under a system as described above (see Patent Publication 1).

As disclosed in Patent Publication 1, a system for providing an efficient delivery of gas cylinders has been conventionally provided. However, there has been no system that dynamically changes meter reading areas allocated to gas meter readers.

CITATION LIST

Patent Literature

PTL1: Japanese Patent Laid-Open No. H08-329159 (1996)

SUMMARY OF INVENTION

In view of the situation as described above, it is an objective of the present invention to provide a meter reader allocation system and a meter reader allocation method by which meter reading areas allocated to gas meter readers can be dynamically changed.

In order to solve the above-described problem, the present invention provides: a system for allocating meter reading areas to meter readers, comprising: a meter reader management unit that manages an order for allocating a plurality of meter readers reading gas meters within the respective areas included in an area group comprising a plurality of areas; an area management unit that manages an order for allocating meter reading areas allocated to any of the plurality of meter readers; and an allocation unit that switches, based on the order for allocating the plurality of meter readers of the meter reader management unit and the order for allocating the areas of the area management unit, areas for which the respective meter readers are responsible, to allocate the switched areas to the respective meter readers.

In order to solve the above-described problem, the present invention provides: a method of allowing a computer to allocate meter reading areas to meter readers, wherein: the computer includes: a meter reader management unit that manages an order for allocating a plurality of meter readers reading gas meters within the respective areas included in an area group comprising a plurality of areas; and an area management unit that manages an order for allocating meter reading areas allocated to any of the plurality of meter readers; the computer includes: switching areas for which the respective meter readers are responsible, based on the order for allocating the plurality of meter readers of the meter reader management unit and the order for allocating the areas of the area management unit, allocating the switched areas to the respective meter readers, and instructing the allocated meter reader to read the corresponding areas.

According to the present invention, meter reading areas allocated to gas meter readers can be dynamically changed.

DESCRIPTION OF EMBODIMENTS

The following section will describe a schematic configuration of a system according to this embodiment. This system is used to allocate areas for which gas meter readers are responsible.

Figure 1:
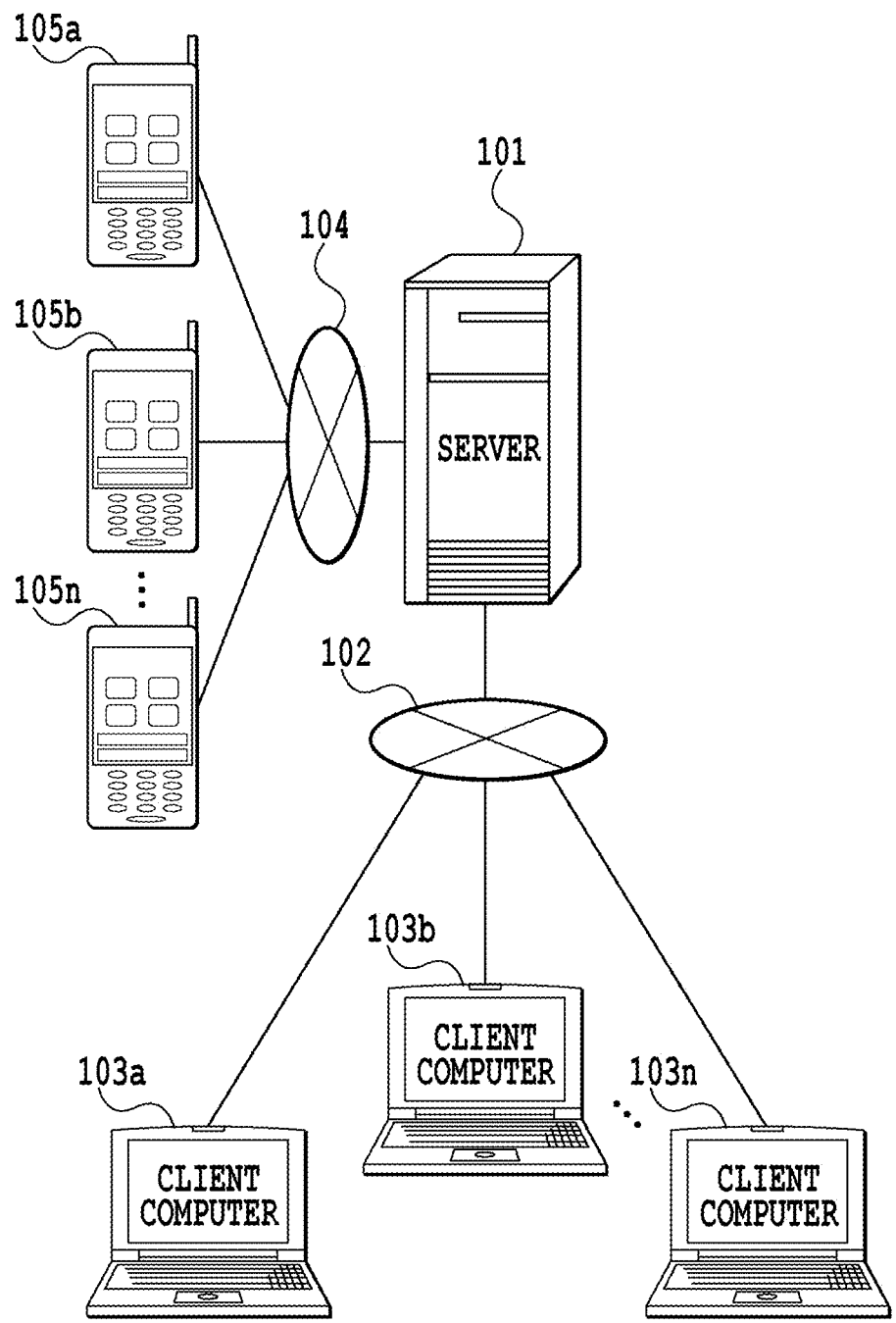
FIG. 1 illustrates an exemplary configuration of a network according to one embodiment of the present invention.

FIG. 1 illustrates a network configuration according to one embodiment of the present invention. In FIG. 1, a server (meter reader allocation system) 101 is configured to communicate, via a network 102, with a plurality of client computers 103a, 103b, ..., 103n. Furthermore, this server 101 is configured to communicate, via a network 104, with a plurality of mobile terminals (communication terminals) 105a, 105b, ..., 105n. In the following description, the client computers 103a to 103n will be collectively referred to as a client computer 103. In the following description, the mobile terminals 105a to 105n will be collectively referred to as a mobile terminal 105.

The client computer 103 is a terminal that is provided, for example, in a delivery center managing the delivery from the respective delivery bases in an integrated manner for example and that is used by a user of the delivery center. The user is connected via the client computer 103 to the server 101 and carries out delivery-related operations (e.g., the confirmation of the situation, an instruction to prepare delivery data) in a dedicated manner. The client computer 103 also may be provided in a delivery base for example.

The mobile terminal 105 is a terminal that is used by a meter reader who checks the meter indication of a gas meter attached to supply facility including gas cylinders. The mobile terminal 105 includes a CPU, a memory, an input device, and a display device for example. The meter reader collects, via the mobile terminal 105, the indication data including the meter indication of the gas meter to send the data to the server 101.

[Server Configuration]

Figure 2:
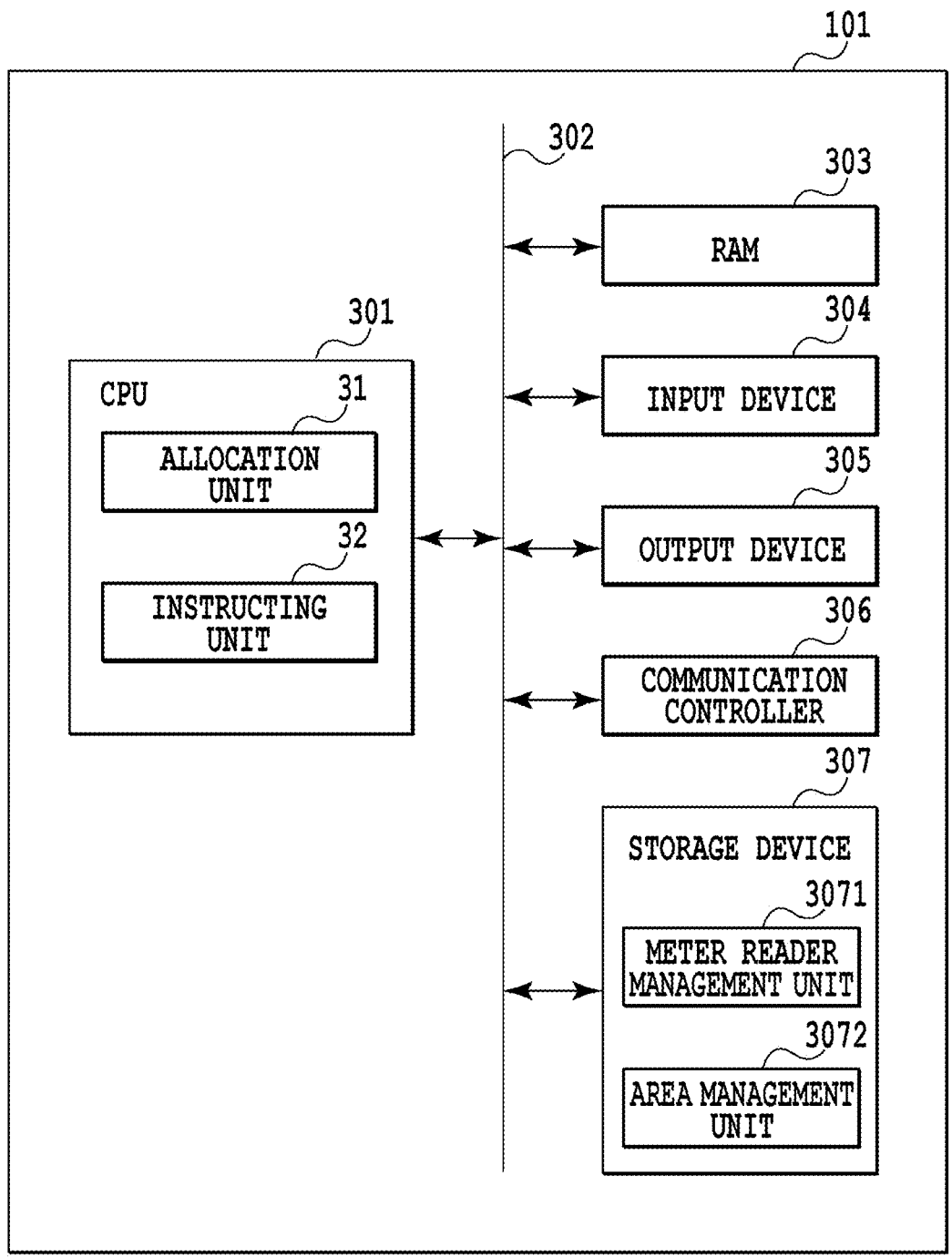
FIG. 2 is a block diagram illustrating an exemplary configuration of the server shown in FIG. 1.

FIG. 2 is a block diagram illustrating a configuration example of the server 101. Although FIG. 2 will be described for a case in which a single computer system, there may be another configuration in which the server 101 constitutes a part of a multifunctional distributed system using a plurality of computers.

As shown in FIG. 2, the server 101 includes a CPU 301, a system bus 302, a RAM 303, an input device 304, an output device 305, a communication controller 306, and a storage device 307.

The CPU 301 is connected to the respective components via a system bus 302 to perform a process to transmit a control signal or data and to carry out the execution or calculation process of various software programs for implementing the operation of the entire server 101 for example.

The RAM 303 includes a work area for temporarily storing data and software programs.

The storage device 307 comprises a nonvolatile storage medium such as ROM or HDD and includes a program storage area for storing software programs and a data storage area for continuously-stored data or processing result data. For example, a software program is read out from the program storage area of the storage device 307 to the work area of the RAM 303 and the software program is executed by the CPU 301, thereby allowing the CPU 301 of this embodiment to implement the functions of the respective parts 31 and 32 (which will be described later).

The CPU 301 includes, as shown in FIG. 2, an allocation unit 31 and an instructing unit 32.

The allocation unit 31 switches the areas for which the respective meter readers are responsible. Specifically, the switching of the areas for which the respective meter readers are responsible is performed based on an order for allocating a plurality of meter readers managed by the meter reader management unit 3071 (which will be described later) and an order for allocating areas managed by the area management unit 3072 (which will be described later).

The switching of the areas for which the respective meter readers are responsible is performed at a predetermined timing. The switching of the areas for which the respective meter readers are responsible may be performed, for example, in a periodic manner (e.g., every one month) or may be performed when the server 101 receives a switching request from the client computer 103 or the mobile terminal 105 for example.

Furthermore, the allocation unit 31 allocates the switched areas to the respective meter readers. The switching or allocation process by the allocation unit 31 will be described later in further detail.

The instructing unit 32 instructs the meter readers allocated by the allocation unit 31 to read the corresponding areas. This instruction may be provided by e-mails and also may be provided when the server 101 receives a query from the mobile terminal 105 for example.

Figure 3:
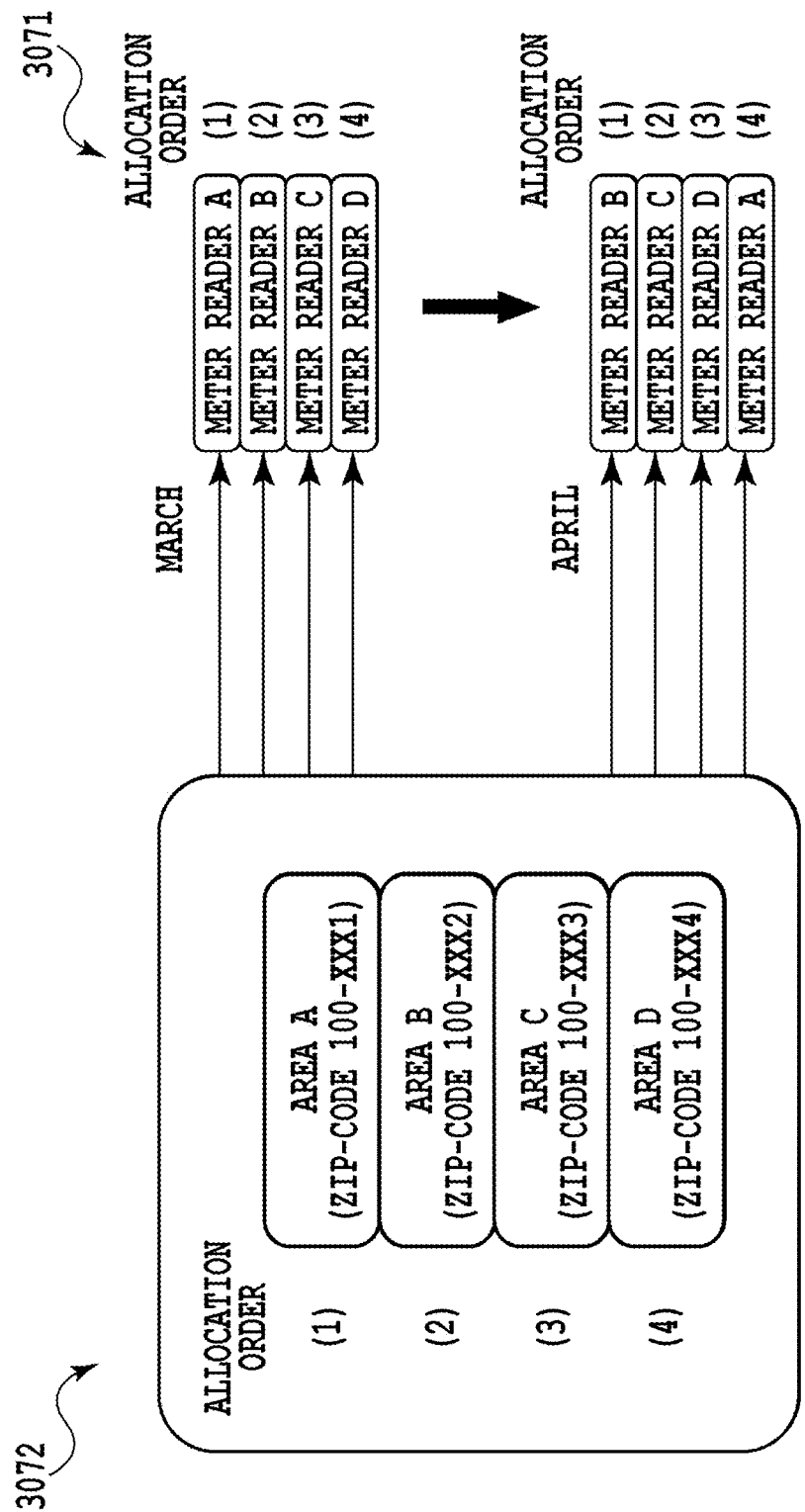
FIG. 3 illustrates an example of an order for allocating meter readers and an order for allocating meter reading areas.

The meter reader management unit 3071 of the storage device 307 is provided to manage an order for allocating a plurality of gas meter readers reading gas meters within the respective areas included in an area group comprising a plurality of areas. The area management unit 3072 of the storage device 307 is provided to manage an order for allocating meter reading areas allocated to any of the plurality of meter readers. FIG. 3 illustrates one example of the allocation order managed by the management units 3071 and 3072.

FIG. 3 illustrates an example of an order for allocating meter readers and an order for allocating meter reading areas. As shown in FIG. 3, the area management unit 3072 shows allocation orders (1) to (4) showing the order for allocating the respective areas to correspond to a plurality of areas A to D divided based on postal codes for example (left side of FIG. 3). The meter reader management unit 3071 records, for example, the allocation orders (1) to (4) with regard to a plurality of meter readers A, B, C, and D scheduled to perform a meter reading in March, respectively (upper-right side of FIG. 3). The allocation orders (1) to (4) for the meter readers A to D are changed at the meter reading in April and the allocation orders for the meter readers A, B, C, and D are recorded in an order of (4), (1), (2), and (3), respectively (lower-right side of FIG. 3).

When the areas for the respective meter readers are switched, the allocation unit 31 allocates the respective areas to the meter readers A to D based on the allocation orders (1) to (4) of the meter readers A to D of the meter reader management unit 3071 and the allocation orders (1) to (4) for the areas A to D of the area management unit 3072. In the allocation example of FIG. 3, the meter readers and the areas have a one-to-one correspondence relationship. Thus, in the case of the meter reading in March, the allocation unit 31 sets the meter reader A to D to have the areas A to D showing the same order as the allocation orders (1) to (4) of the meter readers A to D for example. In the case of the meter reading in April, the allocation unit 31 sets the meter reader A to D to have the areas D and A to C showing the same order as the allocation orders (1) to (4) of the meter readers A to D for example. Specifically, March and April have different areas allocated to the meter readers A to D.

The correspondence relationship between the meter readers and the areas is not limited to 1:1 and also may be, for example, 1:N (N is 2 or more), N (N is an integer of 2 or more):1, or N:M (M is an integer where M≠N).

One example of the allocation order for the meter readers is assumed in which an order of (1) the meter reader A→(2) meter reader B→(3) meter reader C→ . . . , (5) meter reader E is set. One example of the area allocation order is assumed in which an order of (1) area A→(2) area B→(3) area C is set. In this example, since the number of the meter readers and the number of the areas have therebetween a correspondence relationship of 5:3, the allocation is performed so that the meter reader A is responsible for the area A, the meter reader B is responsible for the area B, the meter reader C is responsible for the area C, the meter reader D is responsible for the area A, and the meter reader E is responsible for the area B.

[Operation of Server 101]

Figure 4:
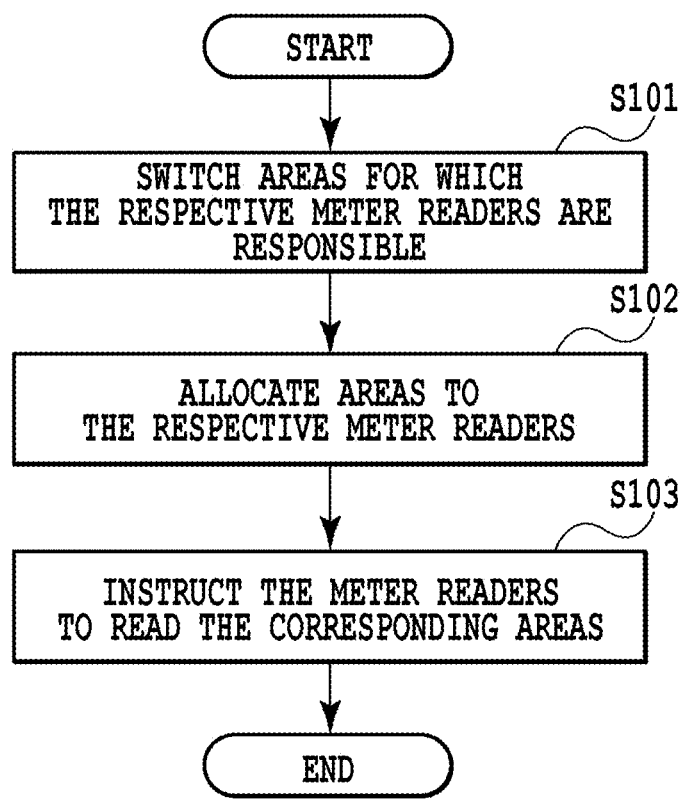
FIG. 4 is a flowchart illustrating an example of the entire operation of the server according to one embodiment of the present invention.

Next, the following section will describe a method of performing a process to allocate areas to the respective meter readers with reference to FIG. 3 and FIG. 4. FIG. 4 is a flowchart illustrating an example of the entire operation of the server 101.

In FIG. 4, the CPU 301 (allocation unit 31) switches the areas for which all meter readers are responsible, based on an order for allocating a plurality of meter readers managed by the meter reader management unit 3071 and an order for allocating areas managed by the area management unit 3072 (S101). This switching is performed periodically (e.g., every one month).

In the illustration in FIG. 3, since the meter readers and the areas have therebetween a correspondence relationship of 1:1, when the CPU 301 allocates the areas to the meter reader for the meter reading in March, the CPU 301 allocates the areas A to D to the respective meter readers A to D for example in the same order as the allocation orders (1) to (4) of the corresponding meter readers. In this case, when the CPU 301 allocates the areas to the meter reader for the meter reading in April, the CPU switches the respective areas for the meter readers A, B, C, and D to the areas D, A, B, and C based on the allocation order of the meter readers A to D and the allocation order of the areas A to D.

When the correspondence relationship between the meter readers and the areas is for example 1:N (N is 2 or more), N (N is an integer of 2 or more):1, or N:M (M is an integer where M≠N), the allocation unit 31 in S101 may switch the respective areas for the meter readers based on the allocation orders for the meter readers and the areas.

Next, the CPU 301 (allocation unit 31) allocates the areas switched in S101 to the respective meter readers (S102). In FIG. 3, the areas for which the meter readers A to D are responsible, for example are different in March and April. Specifically, the respective areas allocated to the plurality of meter readers are changed dynamically.

Furthermore, the CPU 301 (instructing unit 32) instructs the meter readers allocated in S102 to read the corresponding areas (S103). This instruction is performed, for example, by sending to the e-mail addresses of the meter readers information for instructing the meter reading in the corresponding areas (e.g., addresses showing areas, meter reading due dates). As a result, a meter reader can operate the mobile terminal 105 for example to check the information to instruct the meter reading in the corresponding area to thereby know the area.

The CPU 301 continuously performs all meter readers to the allocation process of S101 to S103 shown in FIG. 4 at a predetermined timing (e.g., every one month).

As described above, the server 101 of this embodiment switches, based on the order for allocating the plurality of meter readers and the order for allocating the areas, areas for which the respective meter readers are responsible, to allocate the respective areas of the respective meter readers. As a result, the areas of the respective meter readers are dynamically changed and allocated.

Generally, depending on a situation in an area (e.g., the number of customers, a travel distance, or the density level of houses), the meter reading operation may require a long time or a meter reader may additionally perform the meter reading operations in other areas. Thus, by performing the allocation process as described above, not a single area but a plurality of areas may be allocated, which is preferable.

Furthermore, according to the process shown in FIG. 4, the respective areas in an area group are periodically allocated to the respective meter readers. Thus, when a certain meter reader cannot perform a meter reading and another meter reader performs a meter reading instead of the meter reader, the another meter reader already recognizes the situation within the area and thus can perform a meter reading operation smoothly.

The embodiment has been described as above. A specific data structure for example is not limited to the embodiment and may be modified. For example, the areas are not limited to the example shown in FIG. 3 in which the areas are divided based on postal codes and also can be set in consideration of road conditions for example.

FIG. 3 shows an example in which March and April have different allocation orders of the meter readers A to D and the areas for the meter readers are changed dynamically. However, the areas can be changed from various viewpoints. For example, a configuration in contrast with the example of FIG. 3 may be provided in which only the allocation order for the areas A to D may be set to be different and the areas for the meter readers may be changed at a predetermined timing.

REFERENCE SIGNS LIST

31 Allocation unit
32 Instructing unit
101 Delivery server
105 Mobile terminal
301 CPU
307 Storage device

The invention claimed is:

1. A meter reader allocation system for allocating meter reading areas to meter readers, comprising:
   a meter reader management unit that manages a first order for allocating a plurality of meter readers reading gas meters to respective meter reading areas of a plurality of meter reading areas;
   an area management unit that manages a second order for allocating the respective meter reading areas allocated to any of the plurality of meter readers; and
   an allocation unit that:
      switches the respective meter reading areas based on the first order and the second order;
      changes both of the first order and the second order; and
      allocates the respective meter reading areas to respective meter readers, based on the changed first order and the changed second order.

2. The meter reader allocation system according to claim 1, further comprising:
   an instructing unit that provides instructions to the allocated respective meter readers to read gas meters of the switched respective meter reading areas.

3. The meter reader allocation system according to claim 1, wherein the second order for allocating the respective meter reading areas is set based on postal codes.

4. The meter reader allocation system according to claim 1, wherein the first order differs from the second order.

5. A method of allowing a computer to allocate meter reading areas to meter readers, wherein:
   the computer comprises:
      a meter reader management unit that manages a first order for allocating a plurality of meter readers reading gas meters to respective meter reading areas of a plurality of meter reading areas; and
      an area management unit that manages a second order for allocating the meter reading areas allocated to any of the plurality of meter readers;

wherein the method comprises:
　　switching the respective meter reading areas based on the first order and the second order;
　　changing both of the first order and the second order; and
　　allocating the respective meter reading areas to respective meter readers, based on the changed first order and the changed second order.

6. The method of allowing a computer to allocate meter reading areas to meter readers according to claim 5, wherein the first order differs from the second order.

7. The method of allowing a computer to allocate meter reading areas to meter readers according to claim 5, further comprising:
　　providing instructions to the allocated respective meter readers to read gas meters of the switched respective meter reading areas.

8. The method of allowing a computer to allocate meter reading areas to meter readers according to claim 5, further comprising:
　　setting the second order for allocating the respective meter reading areas based at least in part on postal codes.

9. A non-transitory computer-readable storage medium in which a program to allow a computer to perform a method for allocating meter reading areas to meter readers is stored, wherein:
　　the computer comprises:
　　　　a meter reader management unit that manages a first order for allocating a plurality of meter readers reading gas meters to respective meter reading areas of a plurality of meter reading areas; and
　　　　an area management unit that manages a second order for allocating the meter reading areas allocated to any of the plurality of meter readers;
　　wherein the method comprises:
　　　　switching the respective meter reading areas based on the first order and the second order;
　　　　changing both of the first order and the second order; and
　　　　allocating the respective meter reading areas to respective meter readers, based on the changed first order and the changed second order.

10. The non-transitory computer-readable storage medium in which the program to allow the computer to perform the method for allocating meter reading areas to meter readers is stored according to claim 9, wherein the first order differs from the second order.

11. The non-transitory computer-readable storage medium in which the program to allow the computer to perform the method for allocating meter reading areas to meter readers is stored according to claim 9, further comprising:
　　providing instructions to the allocated respective meter readers to read gas meters of the switched respective meter reading areas.

12. The non-transitory computer-readable storage medium in which the program to allow the computer to perform the method for allocating meter reading areas to meter readers is stored according to claim 9, wherein the second order for allocating the respective meter reading areas is set based at least in part on postal codes.

* * * * *